Patented Feb. 6, 1951

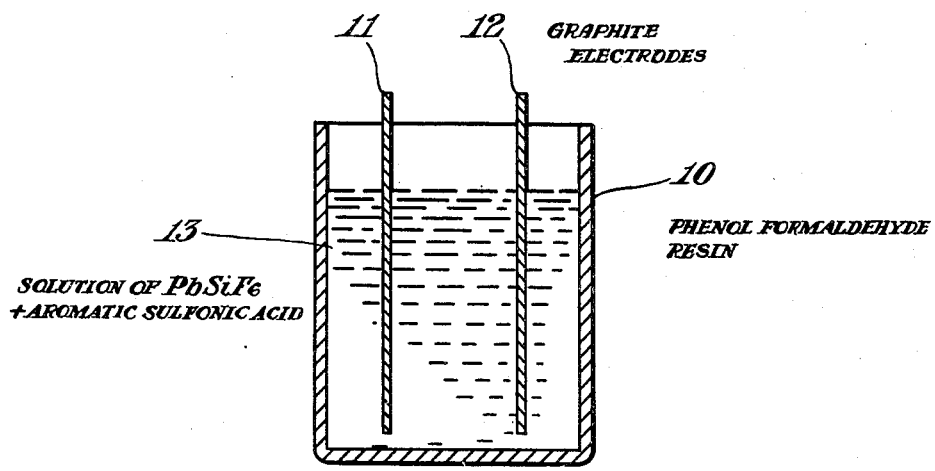

2,540,446

UNITED STATES PATENT OFFICE 2,540,446

ACCUMULATOR WITH ELECTRODES OF GRAPHITE MATERIAL

Pieter Willem Haayman, Frans Cornelis Romeyn, and Evert Johannes Willem Verwey, Eindhoven, Netherlands, assignors to Hartford National Bank and Trust Company, Hartford, Conn., as trustees Application April 26, 1946, Serial No. 665,007
In Belgium April 30, 1945

6 Claims. (Cl. 136—22)

This invention relates to an accumulator of the type in which lead is present in the form of an acid solution of a lead salt when the accumulator is in an uncharged condition. Accumulators of the type under consideration comprise an electrolyte of a lead salt of an acid, which salt under the conditions prevailing in charging and discharging the accumulator, is not attacked by the electromechanical action occurring in the accumulator, for instance lead silico fluoride. When using such an electrolyte the electrodes consist of a material which is not attacked by the electrolyte, such as graphite, rubber-graphite mixtures or the like. Similarly, the other components of the accumulator should be made of a material which is not attacked by the electrolyte.

A disadvantage of accumulators of the aforesaid type is that their life is relatively short due to the fact that on the positive electrode the $PbO_2$ which in charging deposits as a shining black hard layer, drips as a brownish slime from the electrode during discharging. The so dropped material can no longer take part in the cycle of operation of the accumulator. Furthermore, dendritic lead crystals, so-called lead trees, are formed on the negative electrode after repeated charging and then lead trees eventually bring about short circuit of the electrodes.

The invention is based on the realization that the dripping down of the $PbO_2$ during discharging is due to the peptizing influence of the lead ions concentrating in the neighborhood of the positive electrode, so that by the presence of ions having a flocking effect on the deposited particles of $PbO_2$ this phenomenon can be counteracted whereby the deposited particles are made to closely adhere to the electrodes.

The invention has for its object an accumulator of the graphite electrode type in which, moreover, the electrolyte comprises a compound having a flocking effect which, under the conditions prevailing during the discharge, is not seriously attacked or forms an inactive compound in the electrolyte. To such end enter into account, for instance, aromatic sulfonic acids or polysulfonic acids, more particularly of naphthalene, for instance 1-naphthalene sulfonic acid, 2-naphthalene sulfonic acid, 2,7-naphthalene disulfonic acid and 1-naphthol-4-sulfonic acid.

By the said expedient it is ensured not only that the $PbO_2$ no longer changes into a slimy mass during the discharge of the accumulator, but also that the formation of lead trees is counteracted on the negative electrode. In this way much smaller differences occur between the state existing before charging and after the subsequent discharge. Thus the life is largely increased.

Example I

Such a quantity of $PbSiF_6$ is dissolved in distilled water that the liquid has a specific weight of about 1.95, the solution then containing about 0.65 gm. lead per ccm. Upon dissolving, part of the salt hydrolyses and forms a deposit which can be removed by filtering off. Subsequently, per 50 ccm. of the solution, 100 mgs. of sodium salt of 1-naphthalene sulfonic acid, are added, a deposit then being formed which, as the case may be, is filtered off. 50 ccm. of the liquid is introduced into a vessel made from phenol formaldehyde molding material, in which are placed two plate-shaped graphite electrodes having a surface of about 30 cm.$^2$ at a distance of about 2 cm. from each other. The accumulator obtained is charged for 20 hours with a current strength of about 550 ma. at a voltage of about 2 and is then ready for use.

Example II

To 50 ccm. of a solution of $PbSiF_6$, similar to that referred to in Example I, are added 500 mgs. of 2-7-naphthalene disulfonic acid, dissolved in 2 ccm. of distilled water. In this case a deposit of the lead salt in question ensues, but the concentration of the naphthalene disulfonic acid in the electrolyte is sufficient to bring about the desired flocking effect. In the end, however, a certain decomposition of the naphthalene disulfonic acid takes place in the accumulator under the prevailing conditions which, otherwise does not affect the output of the accumulator but which would prevent the flocking effect. This drawback is avoided by not filtering off the said deposit. In this case the electrolyte, owing to the presence of solid naphthalene disulfonic acid lead, remains steadily saturated therewith, so that the desired effect on the $PbO_2$ of the positive electrode of the accumulator is conserved.

The accumulator shown in the drawing comprises a phenol formaldehyde resin container 10, graphite electrodes 11 and 12 and an electrolyte solution 13 of lead silico-fluoride containing an aromatic sulfonic acid as above described.

What we claim is:

1. An accumulator comprising electrodes and an electrolyte comprising a lead-silico-fluoride solution, said solution containing an inactive compound of a soluble naphthalene sulfonic acid having a flocking effect and being substantially free of reaction interfering substituents, said